3,496,128
STABILIZATION OF POLYPROPYLENE
John A. Casey, West Chester, James L. Jezl, Swarthmore, and Louise D. Hague, Villanova, Pa., assignors, by mesne assignments, to Avisun Corporation, Philadelphia, Pa., a corporation of Delaware
No Drawing. Filed Feb. 5, 1959, Ser. No. 791,251
Int. Cl. C08f 45/58
U.S. Cl. 260—23                                26 Claims This invention relates to new compositions of matter, and particularly to compositions of high molecular weight, solid, highly crystalline polymers of propylene containing a plurality of stabilizers which appear to behave synergistically to prevent, or greatly decrease, degradation and discoloring of the polymer by oxidation, heat, and mechanical action.

High molecular weight, predominantly crystalline polymers of propylene have been prepared by use of a catalyst resulting from the reaction of a transition metal salt and a reducing agent such as an organometallic compound or an organometallic halide. Suitable catalysts are prepared, for example, by the reaction of titanium trichloride and aluminum triethyl. The preparation of such polymers is now well known in the art, being described, for example, in Belgian Patent No. 538,782, and in United States Patent No. 2,846,427. A large proportion of the polypropylene prepared by the processes described in these patents has a high degree of steric regularity, corresponding to the general structural formula:

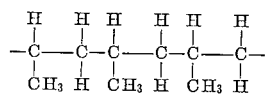

This regular steric configuration causes the polymer to have a marked tendency toward crystallization, which gives the polypropylene utility far beyond that of polypropylene which cannot crystallize. Such polypropylene has been designated "isotactic" by Natta (Angewandte Chemie, vol. 68, No. 12: 393–403, June 21, 1956) and others, and will be so referred to herein.

Isotactic polypropylene is substantially insoluble in boiling n-heptane, whereas "atactic" polypropylene, i.e., polypropylene which does not have the regular steric configuration, is substantially soluble in boiling n-heptane. A means is thereby provided by which the two types of polypropylene may be largely separated, since, in the preparation of isotactic polypropylene, at least a small proportion of atactic polypropylene is also prepared. Predominantly isotactic polypropylene prepared and separated in this manner has a high melting point, usually about 320° F. to 340° F., a density of from about 0.90 to 0.97, and a molecular weight generally above about 100,000, and sometimes as high as several million. The polymer does not pass directly from the solid to the liquid state at its melting point, but retains the properties of an amorphous plastic mass throughout a relatively extended temperature zone. Isotactic polypropylene can be processed at temperatures from 300° F., at which it begins to lose its crystallinity, up to 750° F. or higher, by any of the usual methods for working plastics, including compression molding, extrusion, injection molding, and spinning. Films, fibers, conduits, and molded articles made from isotactic polypropylene have a large number of uses, due to the high melting point and high strength of the polymer.

A major drawback of the isotactic polypropylene, however, is its tendency to be degraded to a lower molecular weight by oxidation, heat, and mechanical working. This deterioration apparently results from free radical formation within the polymer molecules, which formation is promoted by oxygen or ozone and catalyzed by heat, ultraviolet light, mechanical action, and impurities such as metals and metal compounds. The free radicals which are formed undergo chemical reaction with the polymer itself, resulting in undesirable chemical and physical transformations. Thus polypropylene deteriorates prematurely, loses tensile strength and other desirable properties such as pliability or flexibility, and becomes discolored and embrittled.

Due to this tendency of polypropylene to deteriorate during milling, fabrication, storage, handling, and use, it is necessary to add stabilizers to the polymer to prevent, or to decrease, this deterioration. It had previously been thought that the usual stabilizers used in polyethylene would serve to stabilize polypropylene, but it was found that many of these gave virtually no protection, whereas others gave only limited protection. The failure of these polyethylene stabilizers to protect polypropylene from degradation, oxidation and discoloration is believed to be due, in part, to the difference in structure of the polymer molecules. As may be seen from the structural formula hereinbefore given, the polypropylene molecule has a large number of tertiary hydrogen atoms, i.e., hydrogen atoms attached to tertiary carbon atoms. These tertiary hydrogen atoms are very active, and are believed to be easily oxidized, so that hydroxyl, hydroperoxide, and other oxygen containing groups are formed. Furthermore, polypropylene is molded and used at much higher temperatures than is polyethylene. Many stabilizers found effective for polyethylene are unstable at processing temperatures of 450° F. to 600° F., which is the usual range for polypropylene processing. These stabilizers are also effective for only relatively short periods of time at temperatures of 260° F. to 300° F., well within the maximum useful temperature for polypropylene. In addition, the catalysts used to prepare isotactic polypropylene are attached to the polymer molecules, or otherwise dispersed in the polymer in such a way that the catalyst residue is very difficult to remove. Thus isotactic polypropylene usually contains up to several hundred parts per million of free and combined metals, such as titanium, aluminum, and iron (usually from processing equipment). These metals are believed to catalyze oxidation and degradation of the polymer, and to cause discoloration.

It has now been found that certain combinations of stabilizing ingredients are effective, even in very small proportions, to confer excellent stability to isotactic polypropylene. Many of these stabilizing ingredients have previously been used separately in polyethylene, polyvinylchloride, synthetic rubbers, and other polymers, while others have not previously been known to have any utility as stabilizers. When compounded with isotactic polypropylene however, in the manner of the present invention, the stabilizing ingredients appear to act synergistically, resulting in a polymer having an extremely high degree of stability.

According to the present invention, at least two different materials are used to provide effective stabilization of isotactic polypropylene. One of these materials is a hindered phenol, and another is a thio compound. In a preferred embodiment of the invention, a third material is used together with the hindered phenol and the thio compound. This third material is a metal soap or an epoxy compound, and more preferably the composition may include both a metal soap and an epoxy compound, i.e., a compound having one or more epoxy groups per molecule. Still more advantageous results may be obtained by including, as a fifth component, a polycarboxylic acid.

Any one of the large number of hindered phenols known to function as stabilizers in polyethylene and other polymers may be used. Such hindered phenols include the 2,4,6-trialkyl phenols, the alkylated bisphenols, and the alkylated trisphenols.

Suitable 2,4,6-trialkyl phenols include those described for use in rubbery polymers in United States Patent No. 2,581,907, issued Jan. 8, 1952 to Smith et al. Good results may be obtained with any of the materials described in the patent, when used in conjunction with other components according to this invention, although the preferred 2,4,6-trialkyl phenols have secondary or tertiary alkyl groups at the 2 and 6 positions, and a normal alkyl group at the 4 position. For example, preferred materials include 2,6-di-tert-butyl-p-cresol; 2,6-dicyclohexyl-p-cresol; 2,6-diisopropyl-4-ethylphenol; 2,6-di-tert-amyl-p-cresol; 2,6-di-tert-octyl-4-n-propylphenol; 2,6-di-cyclohexyl-4-n-octylphenol; 2 - isopropyl - 4 - methyl-6-tert-butylphenol; 2 - tert-butyl - 4 - ethyl-6-tert-octylphenol; 2-isobutyl-4-ethyl-6-tert-hexylphenol; and 2-cyclohexyl-4-n-butyl-6-isopropyl phenol. Preferably, the 4 position alkyl group contains from 1 to 20 carbon atoms, and the 2 and 6 position alkyl groups are secondary or tertiary groups containing from 3 to about 20 carbon atoms, or cyclic hydrocarbon groups.

Other types of hindered phenols which are suitable for use in the composition of this invention are those having the general structural formula:

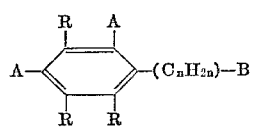

wherein $n$ is from 0 to about 8; wherein B is selected from the group consisting of (1) 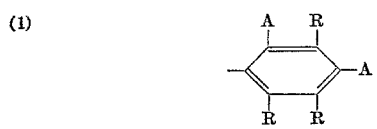

(2) 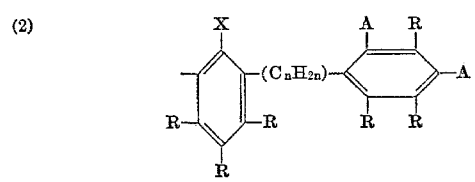

and (3) 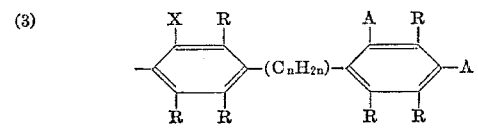

wherein one A on each ring is a hydroxyl group and the other A is a hydrogen or hydrocarbon radical containing 1 to about 16 carbon atoms, X is a hydroxyl group or a hydrocarbon radical containing 1 to about 16 carbon atoms, and R is a hydrogen or a hydrocarbon radical having from 1 to about 16 carbon atoms. It is preferred that groups ortho to the hydroxyl groups be secondary or tertiary alkyl groups or cyclic radicals, since these appear to provide better hindering than normal alkyl groups.

These compounds are usually prepared by reacting an aldehyde with an excess of a phenol, and a large number of them are known in the art as stabilizers for various polymers. The use of such compounds to stabilize synthetic rubbers is described, for example, in United States Patent No. 2,731,443, issued Jan. 17, 1956, to Forman.

The substituents on the phenol nuclei include, for example, methyl, ethyl, propyl, butyl, amyl, hexyl, heptyl, octyl, nonyl, cyclohexyl, benzyl, and alpha-methyl benzyl radicals, and similar hydrocarbon substituents having up to about 16 carbon atoms. Preferred stabilizers of the hindered bisphenol type include: 2,2'-methylene-bis-(4-methyl-6-tert-butylphenol), 2,2' - methylene-bis-(4-ethyl-6-tert-butyl phenol), 4,4'-isopropylidene-bis(2-tert-butyl phenol), 4,4' - methylene - bis(2,6-di-tert-butyl phenol), 4,4'-methylene-bis(2,6-di-tert-amyl phenol), 2,2'-methylene-bis(p-cresol), 2,2'-methylene-bis(4,6-dimethyl phenol), 4,4'-methylene-bis(6-tert-butyl-o-cresol), 2,2'-ethylidene-bis(4-6-dimethyl phenol), 2,2' - ethylidene - bis(4-methyl-6-butylphenol), 4,4-bis(2-methyl-6-t-butyl phenol), 4,4'-bis(2,6-di-tert-butyl phenol), 2,6-bis(2-hydroxy-3-t-butyl-5-methyl benzyl)-4-methyl phenol, and bis(2-hydroxy-3-t-butyl-5-methyl phenyl methyl)durene.

The 2,4,6-trialkyl phenols described hereinbefore are the preferred hindered phenols to use, since the polynuclear phenols tend to discolor quite badly when subjected to heat. These materials do not, however, discolor in sunlight, and therefore give very good results in many applications.

The second component used to prepare the stabilized polypropylene compositions of this invention is a thio compound selected from the following groups:

(a) A metal dithiocarbamate having the general formula:

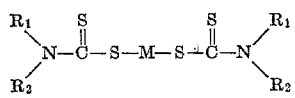

wherein M is zinc, cadmium, or mercury; and each $R_1$ and $R_2$ is an alkyl radical having from 1 to about 6 carbon atoms, preferably no more than 4 carbon atoms, or an aromatic hydrocarbon radical.

(b) A trithiophosphite, the alcohol moieties of which are the same or different cyclic or acylic hydrocarbon radicals each having from about 6 to about 20 carbon atoms.

(c) A thio-bis(carboxylic acid ester) having the general structural formula:

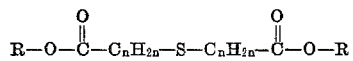

wherein R is a hydrocarbon radical having from about 6 to about 20 carbon atoms, and $n$ is an integer from 1 to about 20, and preferably from 1 to about 6.

(d) A thioether having the general structural formula R—S—R, wherein R is a hydrocarbon radical having from about 6 to about 20 carbon atoms.

Suitable dithiocarbamates, as defined in (a) above, include zinc diethyl dithiocarbamate, zinc dibutyl dithiocarbamate, cadmium dibutyl dithiocarbamate, cadmium dimethyldithiocarbamate, mercury dipropyl dithiocarbamate, and zinc diphenyldithiocarbamate.

Suitable trialkyl trithiophosphites include trilauryl trithiophosphite, tristearyl trithiophosphite, tribenzyl trithiophosphite, tricyclohexyl trithiophosphite, and tripalmityl trithiophosphite.

The suitable materials of group (c) above include dilauryl thiodipropionate, distearyl thiodipropionate, dihexyl thiodibutyrate, diphenyl thiodicaproate, and the like.

Typical thioethers giving good results in the compositions of this invention include dihexadecyl sulfide, dibenzyl sulfide, diphenyl sulfide, dicyclohexyl sulfide, dieicosyl sulfide, and didecyl sulfide.

Suitable metal soaps for use in the compositions of this invention include the soaps of Groups II, III, and IV metals, including those of beryllium, calcium, magnesium, strontium, barium, zinc, cadmium, boron, aluminum, titanium, and zirconium. A partial list of suitable metal soaps includes calcium stearate, zinc stearate, zinc naphthenate, barium stearate, barium naphthenate, cadmium stearate, barium ricinoleate, barium laurate, cadmium laurate, aluminum stearate, titanium stearate, zirconium laurate, barium laurate, calcium myristate, barium palmitate, and their analogues and homologues having from about 8 to 18 carbon atoms per molecule. Various mixtures of these soaps are marketed commercially, and these mixtures also give good results in the compositions of this invention.

Any of the many well known epoxy resins may be used as the epoxy compound. For example the resins prepared by the reaction of epichlorohydrin with ethylene glycol, glycerol, or 4,4'-isopropylidene bisphenol give good results. Also various epoxidized fatty acids, terpenes, olefins, polyolefins and fatty acid esters are suitable in the compositions of this invention. Suitable epoxy compounds include Epon 834 (Shell Chemical Company trade name for an epoxy resin prepared by the condensation of a bisphenol and epichlorhydrin); Epon 562 (Shell Chemical Company trade name for a glycidyl ether of glycerol); poly(alkyl glycidyl ether); diglycidylether; epoxy fatty acid esters such as vinyl epoxy stearate, allyl epoxy stearate, butyl epoxy stearate, and cetyl epoxy stearate; di-n-butyl epoxyhexahydrophthalate and the di-n-hexyl, di-2-ethylhexyl, diisooctyl, di-n-decyl, and n-butyl decyl homologues thereof; 3,4-epoxycyclohexyl methanol esters of 2-ethylhexanoic acid, lauric acid, palmitic acid, 9,10-epoxystearic acid, 9,10,12,13-diepoxystearic acid, succinic acid, maleic acid, terephthalic acid, and sebacic acid; dialkyl 4,5-epoxycyclohexane-1,2-dicarboxylates, including the dimethyl, diethyl, dibutyl, di(2-ethylhexyl), di(isodecyl), and di(tridecyl) derivatives thereof; and epoxidized metal soaps such as calcium epoxy stearate, barium epoxy stearate, zirconium epoxylaurate, and calcium epoxy myristate.

The presence of certain polycarboxylic aliphatic acids appears to enhance the action of the hereinbefore described stabilizers. These acids are those having two or three carbon atoms between at least one pair of carboxyl groups. Suitable acids, for example, include succinic acid, glutaric acid, maleic acid, malic acid, citric acid, gluconic acid, trihydroxyglutaric acid, tricarballylic acid, itaconic acid, and aconitic acid. Preferably, such acids should have at least one hydroxyl group in addition to those in the carboxyl group. In addition to these acids, alkali and alkaline earth metal salts and partial esters of these acids, having at least two hydroxyl, carboxyl, or a combination of hydroxyl and carboxyl groups, may be used.

Only small amounts of the stabilizers of this invention are required to impart a high degree of stability to polypropylene. As little as 0.005% by weight of each ingredient is effective to impart considerable stability to the polymer, although preferably at least about 0.1% of each ingredient is used. No advantage is derived from the use of excessive amounts of the various stabilizers, therefore generally the total amount of stabilizers used is no more than about 5% by weight, and no more than about 2% of each stabilizing ingredient is used.

The stabilizing ingredients may be combined with the polypropylene in any manner suitable for the preparation of homogeneous mixtures. For example, the polypropylene may be heated above its melting point and the additives admixed therewith by milling on heated rolls, or by use of a Banbury mixer. Alternatively, the additives may be added, in a solid or molten state, to a solution or suspension of the polymer in a suitable liquid, and the liquid carrier subsequently removed by vaporization. A preferred process is to dissolve the additives in a suitable solvent, admix powdered polypropylene therewith, and evaporate the solvent. More uniform mixtures are obtained in this way, without danger of excessive degradation of the polymer. In any event, the mixing process should be carried out in an inert atmosphere, in order to prevent oxidation of the polypropylene.

Several criteria are used to determine the effectiveness of the stabilizers in the compositions of this invention. Since unstabilized polypropylene is normally drastically degraded during formation into articles of manufacture, e.g. by extrusion, molding, rolling, etc., the extent of this degradation is measured. This is determined by the change in melt index. Melt index is a measure of melt viscosity, and is the rate, in grams per 10 minutes, at which the polypropylene composition is extruded through an orifice 0.0823 inch in diameter from a barrel 0.3760 inch in diameter under the force of a piston weighing 2160 grams, the composition being maintained at 230° C. (446° F.) during the extrusion. The initial melt index is determined by loading the cylinder with the composition, applying the piston, and heating for 5 minutes. Any extrudate is cut off, and the extrudate for the next 6 minutes is measured. The amount of this extrudate, converted to grams per 10 minutes (by multiplying by 1⅔) is the initial melt index ($MI_a$). All the polymer is then extruded, and replaced in the cylinder. After 10 more minutes at 230° C., the piston is again inserted and all the polymer is extruded. The polymer is again returned to the cylinder, held for 10 minutes, and extruded. This time the polymer is returned to the cylinder and the piston applied immediately. After 4 minutes all extrudate is cut off, and the extrudate for the next 6 minutes is measured. The amount of this extrudate, converted to grams per 10 minutes, is the final melt index ($MI_b$). The stability of a polymer composition is indicated by the ratio of $MI_b$ to $MI_a$, a low ratio indicating a high degree of stability. This ratio should be less than about 3.5 in order for the composition to be adaptable to a wide variety of processing methods.

It has been found, however, that some stabilizers are relatively ineffectual upon initial subjection to degrading conditions, but become substantially more effective after prolonged exposure to such conditions. A composition containing such a stabilizer would therefore have a relatively high initial melt index, so that the melt index ratio would be deceptively low. In order to more accurately compare these stabilizers with others, a standard initial melt index ($MI_s$) has been adopted. This standard initial melt index is the lowest of the initial melt indexes determined for a group of polypropylene compositions containing various stabilizers and groups of stabilizers. In the following examples, therefore, $MI_b/MI_s$ means the ratio between the final melt index ($MI_b$) of each composition, and the standard initial melt index for the group. For uniformity of product, this ratio should not be more than about 4.0.

In addition to degradation during fabrication, articles made from unstabilized polypropylene are also rapidly degraded and oxidized by exposure to high temperatures during normal use of such articles. Such degradation and oxidation is evidenced by discoloration and by crazing and crumbling of the surface of the molded article. The crazing consists of small surface cracks which, once started, progress quite rapidly until the entire surface of the article is crazed. The crumbling also progresses quite rapidly after it first becomes noticeable. The molded articles become so friable that edges and corners are easily rubbed off with the fingers.

In the examples below, the molded articles used were molded sheets 3/32" to 1/8" thick. Above 3/32" the thickness of the sheet appears to have little or no effect on the resistance of the polypropylene to heat and oxidation. These sheets were placed in an oven and held at 280° F. until crazing appeared, or until they became friable, as evidenced by breaking a corner or an edge with the fingers. The oven life recorded in the examples is the number of hours at 280° F. before such evidence of degradation and oxidation appeared. An oven life of at least 500 hours is necessary for a polymer composition to be useful in a majority of applications.

Unstabilized polypropylene also becomes badly discolored during exposure to high temperatures. This discoloration does not appear to be directly related to the oxidation and degradation of the surface. Although the basic reason for the discoloration is not known for a certainty, it appears that it may be caused by various impurities in the polymer, such as the residue from the polymerization catalyst. It also appears that many stabilizers such as the polynuclear phenols, impart some color to the polypropylene, even though these stabilizers are effective to reduce degradation and oxidation of the polymer. The high temperatures used during fabrication or high temperature in various applications of the polymer, apparently initiate some reaction between the various impurities in the polymer which results in the formation of the color bodies which cause discoloration of the polymer.

A color scale has been devised to compare the colors of polypropylene articles. Colors on the scale range from No. 1, which is nearly clear, about like frosted glass, to No. 10, which is a dark, reddish brown, similar to dark mahogany. No. 2 color is slightly tinged with yellow, and No. 4 color has a slight orange tinge. Colors from 1 to 4 are deemed satisfactory for practically all applications of polypropylene, while darker colors limit the use of the polymer to those applications where a dark color is not objectionable.

The colors listed in the examples are the colors of the molded sheets in the 280° F. oven after one week (168 hours) or upon failure, whichever is less. Note that very poor colors are obtained with polynuclear phenols alone in the composition, somewhat better colors are generally obtained with mononuclear phenols, and excellent colors are obtained with most of the thio compounds, metal soaps, and epoxy compounds, when used alone. Even when used together with a thio compound, the discoloring tendency of the polynuclear phenols is very strong, whereas excellent colors are obtained with compositions containing a mononuclear phenol and a thio compound.

In each of the following examples, the proportion of the stabilizer given is the weight percent based on the weight of polypropylene used.

EXAMPLES 1–26

In the following examples, tests were made to determine the stability of unstabilized polypropylene and of the same polypropylene containing only one stabilizing ingredient. The polypropylene used was about 95% isotactic, and had a molecular weight of about 400,000 and a 335° F. melting point.

| Example | Stabilizer | Percent | $MI_a$ | $MI_b/MI_a$ | $MI_b/MI_s$ | Oven Life | Color |
|---|---|---|---|---|---|---|---|
| 1 | 2,2'-methylene-bis-(4-ethyl-6-t-butyl phenol) | .5 | .082 | 2.5 | 3.8 | 216 | 8 |
| 2 | do | .25 | .064 | 2.3 | 3.3 | 185 | 9 |
| 3 | do | .50 | .063 | 2.9 | 3.4 | 280 | 10 |
| 4 | 2,2'-methylene-bis-(4-methyl-6-t-butyl phenol) | .1 | .063 | 2.5 | 2.9 | 144 | 9 |
| 5 | do | .5 | .065 | 2.0 | 2.4 | 249 | 10 |
| 6 | 2,2'-methylene-bis-(p-cresol) | .5 | .104 | 3.8 | 7.2 | 281 | 10 |
| 7 | 4,4'-methylene-bis-(6-t-butyl-o-cresol) | .5 | .067 | 3.3 | 4.1 | 161 | 5 |
| 8 | 4,4'-methylene-bis-(2,6-di-t-butylphenol) | .5 | .061 | 2.8 | 3.1 | 275 | 5 |
| 9 | 4,4'-bis(2,6-di-t-butyl phenol) | .5 | .057 | 3.5 | 3.7 | 227 | 5 |
| 10 | 4,4'-bis(2-methyl-6-t-butyl phenol) | .5 | .078 | 4.3 | 6.2 | 251 | 6 |
| 11 | bis(2-hydroxy-3-t-butyl-5-methylphenyl methyl) durene | .5 | .062 | 2.5 | 2.9 | 1,000 | 10+ |
| 12 | 2,6-bis(2-hydroxy-3-t-butyl-5-methyl benzyl)-4-methylphenol | .5 | .054 | 2.0 | 2.0 | 497 | 10 |
| 13 | 2,6-di-t-butyl-p-cresol | .5 | .054 | 3.4 | 3.4 | 70 | 4 |
| 14 | 2,4,6-tri-t-amyl phenol | .5 | .120 | 3.7 | 4.4 | 32 | 4 |
| 15 | do | .69 | .068 | 3.4 | 5.5 | 59 | 4 |
| 16 | 2,6-dicyclohexyl-p-cresol | .5 | .062 | 2.5 | 2.9 | 908 | 10 |
| 17 | Zinc dibutyl dithio carbamate | .1 | .124 | 10.9 | 25.0 | 456 | 5 |
| 18 | do | .5 | .110 | 3.2 | 6.5 | 969 | 5 |
| 19 | Dilauryl thiodipropionate | .5 | .232 | 3.1 | 13.3 | 2,860 | 1 |
| 20 | Trilauryl trithiophosphite | .5 | .089 | 4.1 | 6.7 | 1,400 | 1 |
| 21 | Dihexadecyl sulfide | .5 | .094 | 4.8 | 8.3 | 90 | 1 |
| 22 | Calcium stearate | .25 | 1.918 | 3.9 | 112.0 | 17 | 1 |
| 23 | Barium-cadmium laurate | .5 | .092 | 3.2 | 5.5 | 46 | 1 |
| 24 | Epon 834 [1] | .5 | .101 | 5.3 | 10.0 | 64 | 1 |
| 25 | Butyl epoxy stearate | .5 | .198 | 14 | 51.6 | 24 | 1 |
| 26 | None | | .192 | 10.5 | 37.2 | 12 | 1 |

[1] Trademark of Shell Chemical Company for an epoxy resin prepared by condensation of a bisphenol and epichlorohydrin having the formula:

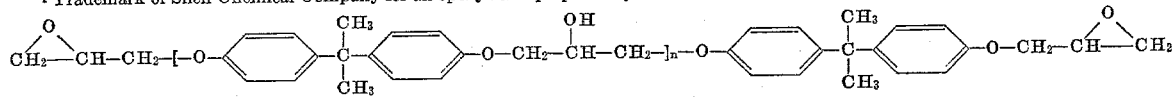

[viscosity, 25° C.—4.1 to 9.7 poises and an epoxide equivalent of from about 230 to about 280 (grams of resin containing 1 gram equivalent of epoxide].

Of all the stabilizers shown here, only those of Examples 11, 12, and 16 impart sufficient stability to polypropylene to allow their use alone in a majority of applications. The stabilizing effect of these materials is remarkably improved, however, by adding a thio compound to the composition, as shown in the following examples.

EXAMPLES 27–42

The following examples show the synergistic effect that is obtained by use of both a hindered phenol and a thio compound in polypropylene.

| Example | Stabilizers | Percent | $MI_a$ | $MI_b/MI_a$ | $MI_b/MI_s$ | Oven life | Color |
|---|---|---|---|---|---|---|---|
| 27 | 2,2'-methylene-bis-(4-ethyl-6-t-butyl phenol)<br>Zinc dibutyl dithiocarbamate | .25<br>.25 | .090 | 2.2 | 3.6 | 613 | 7 |
| 28 | 2,2'-methylene-bis-(4-ethyl-6-t-butyl phenol)<br>Zinc dibutyl dithiocarbamate | .25<br>.5 | .075 | 1.9 | 2.1 | 648 | 7 |
| 29 | 2,2'-methylene-bis-(4-ethyl-6-t-butyl phenol)<br>Dilauryl thiodipropionate | .1<br>.5 | .100 | 1.6 | 1.6 | 2,200+ | 7 |
| 30 | 2,2'-methylene-bis-(4-ethyl-6-t-butyl phenol)<br>Dihexadecyl sulfide | .1<br>.1 | .069 | 2.6 | 3.3 | 474 | 7 |
| 31 | 2,2'-methylene-bis-(4-ethyl-6-t-butyl phenol)<br>Dihexadecyl sulfide | .5<br>.1 | .062 | 3.5 | 4.0 | 700+ | 10+ |
| 32 | 2,2'-methylene-bis-(4-methyl-6-t-butyl phenol)<br>Dilauryl thiodipropionate | .25<br>.5 | .096 | 1.8 | 1.7 | 2,200+ | 10+ |
| 33 | 4,4'-methylene-bis-(2,6-di-t-butyl phenol)<br>Dilauryl thiodipropionate | .25<br>.5 | .092 | 2.0 | 1.8 | 2,200+ | 9 |
| 34 | 4,4'-bis(2,6-di-t-butyl phenol)<br>Dilauryl thiodipropionate | .25<br>.5 | .087 | 2.2 | 1.9 | 2,200+ | 4 |
| 35 | bis(2-hydroxy-3-t-butyl-5-methyl-phenylmethyl) durene<br>Dilauryl thiodipropionate | .25<br>.5 | .107 | 2.0 | 1.9 | 2,200+ | 9 |
| 36 | bis(2-hydroxy-3-t-butyl-5-methyl-phenyl methyl) durene<br>Trilauryl trithiophosphite | .25<br>.5 | .073 | 1.5 | 2.0 | 600+ | 6 |
| 37 | 2,6-bis(2-hydroxy-3-t-butyl-5-methyl benzyl)4-methyl phenol<br>Dilauryl thiodipropionate | .25<br>.5 | .094 | 1.7 | 1.6 | 2,200+ | 10+ |
| 38 | 2,6-di-t-butyl-p-cresol<br>Zinc dibutyl dithiocarbamate | .25<br>.5 | .057 | 1.8 | 2.1 | 1,566 | 1 |
| 39 | 2,6-di-t-butyl-p-cresol<br>Dilauryl thiodipropionate | .25<br>.25 | .065 | 3.3 | 4.0 | 1,400+ | 1 |
| 40 | 2,6-di-t-butyl-p-cresol<br>Dilauryl thiodipropionate | .25<br>.5 | .051 | 1.8 | 1.7 | 2,600+ | 1 |
| 41 | 2,6-di-t-butyl-p-cresol<br>Trilauryl trithiophosphite | .25<br>.5 | .056 | 3.5 | 3.6 | 1,626 | 1 |
| 42 | 2,6-di-t-butyl-p-cresol<br>Dihexadecyl sulfide | .25<br>.5 | .090 | 1.6 | 2.7 | 1,794 | 1 |

The synergistic stabilizing effect of the combinations of this invention is evident upon comparing Example 27 with Examples 3 and 18. Note that 0.5% of 2,2'-methylene-bis (4-methyl-6-t-butyl phenol) gives a polyproplyene composition having a $MI_b/MI_a$ ratio of 2.9; 0.5% of zinc dibutyl dithiocarbamate gives a composition having a $MI_a/MI_a$ ratio of 3.2; wherein, in Example 27, 0.25% of each of these materials results in a composition having a $MI_b/MI_a$ ratio of 2.2. Also compare Example 29 with Examples 1 and 19, where the same ratio is improved from 2.5 and 3.1, respectively, to 1.6. Example 30, when compared with Examples 1 and 21, clearly illustrates the synergistic effect of the stabilizing combinations of this invention as it affects oven life. The oven life is increased from 216 hours in Example 1 and 90 hours in Example 21, to 474 hours in Example 30. Note that the synergistic effect is also demonstrated here in the $MI_b/MI_s$ ratio, and that a much lesser proportion of the dihexadecyl sulfide is used in the composition of Example 30 than in that of Example 21. A comparison of Examples 13, 18, and 38 shows synergism as to both melt index ratios, oven life, and color. Also note that, in comparing Examples 13, 19, and 40, the melt index ratios are improved considerably, and the discoloring effect of the 2,6-di-t-butyl-p-cresol was eliminated. The oven life of the test specimen used for Example 40 is not known, since the specimen had not failed at the time of filing of this application.

Thus it is readily seen that a synergistic effect is obtained by the use of both a hindered phenol and a thio compound. Melt index ratios are reduced, and oven life is greatly extended, by the use of such combinations. Similar results are obtained with homologues and analogues, as set forth herein, of the compounds used for the examples.

EXAMPLES 43–61

Still better results are obtained by the addition of a third, and even a fourth material to the stabilizing combination. Such improved compositions are illustrated by the following examples:

| Example | Stabilizers | Percent | $MI_a$ | $MI_b/MI_a$ | $MI_b/MI_s$ | Oven life | Color |
|---|---|---|---|---|---|---|---|
| 43 | 2,2'-methylene-bis (4-ethyl-6-t-butyl phenol)<br>Zinc dibutyl dithiocarbamate<br>Calcium stearate | .1<br>.25<br>.25 | .073 | 2.6 | 3.6 | 816 | 10+ |
| 44 | 2,2'-methylene-bis (4-ethyl-6-t-butyl phenol)<br>Zinc dibutyl dithio carbamate<br>Calcium stearate | .25<br>.25<br>.25 | .313 | 1.9 | 3.1 | 825 | 10+ |
| 45 | 2,2'-methylene-bis (4-ethyl-6-t-butyl phenol)<br>Zinc dibutyl dithiocarbamate<br>Calcium stearate | .25<br>.50<br>.25 | .075 | 1.9 | 2.7 | 1,000+ | 10+ |
| 46 | 2,2'methylene-bis (4-ethyl-6-t-butyl phenol)<br>Zinc dibutyl dithiocarbamate<br>Barium-cadmium laurate | .1<br>.1<br>.1 | .077 | 1.8 | 2.6 | 512 | 10+ |
| 47 | 2,6-di-t-butyl-p-cresol<br>Dilauryl thiodipropionate<br>Calcium stearate | .5<br>.5<br>.25 | 1.249 | 2.1 | 2.2 | 2,800+ | 1 |

| Example | Stabilizers | Percent | MI$_a$ | MI$_b$/MI$_a$ | MI$_b$/MI$_s$ | Oven life | Color |
|---|---|---|---|---|---|---|---|
| 48 | 4,4'-methylene-bis (2,6-di-t-butyl phenol)<br>Dilauryl thiodipropionate<br>Calcium stearate | .25<br>.5<br>.25 | .544 | 2.0 | 2.2 | 700+ | 4 |
| 49 | 4,4'-methylene-bis (2,6-di-t-butyl phenol)<br>Dilauryl thiodipropionate<br>Barium-cadmium laurate | .25<br>.5<br>.25 | .661 | 2.2 | 2.9 | 700+ | 4 |
| 50 | bis(2-hydroxy-3-t-butyl 5-methyl phenyl methyl) durene<br>Dilauryl thiodipropionate<br>Butyl epoxy stearate | .25<br>.5<br>.25 | .799 | 2.3 | 3.6 | 1,200+ | 5 |
| 51 | 2,6-di-t-butyl-p-cresol<br>Zinc dibutyl dithiocarbamate<br>Calcium stearate | .5<br>.5<br>.25 | 1.75 | 1.9 | 2.9 | 1,000 | 2 |
| 52 | 2,6-di-t-butyl-p-cresol<br>Dilauryl thiodipropionate<br>Barium naphthenate | .25<br>.5<br>.25 | .185 | 2.1 | 3.5 | 800+ | 1 |
| 53 | 2,6-bis(2-hydroxy-3-t-butyl-5-methyl benzyl)-4-methyl phenol<br>Trilauryl trithiophosphite<br>Butyl epoxy stearate | .25<br>.5<br>.25 | .165 | 1.8 | 2.7 | 800+ | 4+ |
| 54 | 4,4'-methylene-bis-(2,6-di-t-butyl phenol)<br>Trilauryl trithiophosphite<br>Butyl epoxy stearate | .25<br>.5<br>.25 | .133 | 2.0 | 2.4 | 800+ | 5 |
| 55 | bis(2-hydroxy-3-t-butyl-5-methyl phenyl methyl) durene<br>Dilauryl thiodipropionate<br>Calcium stearate | .25<br>.5<br>.25 | 1.317 | 2.0 | 2.1 | 2,000+ | 10 |
| 56 | 4,4'-methylene-bis-(2,6-di-t-butyl phenol)<br>Dihexadecyl sulfide<br>Calcium stearate<br>Butyl epoxy stearate | .25<br>.5<br>.25<br>.25 | .574 | 2.2 | 2.5 | 900+ | 3+ |
| 57 | 2,2'-methylene-bis-(4,ethyl-6-t-butyl phenol)<br>Dihexadecyl sulfide<br>Calcium stearate<br>Epon 834 | .5<br>.5<br>.25<br>.25 | 1.14 | 1.5 | 1.5 | 2,800+ | 6 |
| 58 | 4,4'-methylene-bis (2,6-di-t-butyl phenol)<br>Dilauryl thiodipropionate<br>Calcium stearate<br>Epon 834 | .5<br>.5<br>.25<br>.25 | 1.25 | 2.0 | 2.2 | 2,800+ | 3 |
| 59 | 2,6-di-t-butyl-p-cresol<br>Dihexadecyl sulfide<br>Calcium stearate<br>Epon 834 | .5<br>.5<br>.25<br>.25 | 1.23 | 2.2 | 2.4 | 2,800+ | 4 |
| 60 | 2,2'-ethylene-bis-(4-ethyl-6-t-butyl phenol)<br>Dihexadecyl sulfide<br>Calcium stearate<br>Epon 834 | .1<br>.1<br>.1<br>.1 | .062 | 2.2 | 2.5 | 528 | 3+ |
| 61 | 2,2'-methylene-bis-(4-ethyl-6-t-butyl phenol)<br>Dihexadecyl sulfide<br>Calcium stearate<br>Epon 834<br>Citric acid | .1<br>.1<br>.1<br>.1<br>.1 | .060 | 1.6 | 1.8 | 521 | 4 |

Even though the color of many of the compositions of this invention is darker than is desirable for many applications, these compositions are still satisfactory for many applications where color is not a factor, such as for use as wire or cable coverings. In addition, many of the compositions which discolor upon extended exposure to high temperatures, such as those containing the bis-phenols, do not discolor when subjected to ultraviolet light. One sample, corresponding to that of Example 44 herein, changed to a No. 2 color in sunlight after being darkened to a No. 10+ color in the 280° F. oven. Thus for many applications where color is important, even the compositions containing bis-phenols are stable against discoloration, as well as against degradation during processing or by high temperatures.

Many other compositions, within the scope of the invention as set forth hereinbefore and in the appended claims, were prepared and found to give similar results. The invention is therefore not limited by the preceding examples, but only as set forth by the claims.

The invention claimed is:
1. A composition of matter comprising predominantly crystalline polypropylene and (a) 0.005 to 2 weight percent of a hindered phenol selected from the group consisting of 2,4,6-trialkyl phenols and phenols having the general formula:

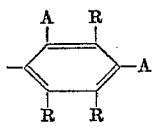

wherein B is a radical selected from the group consisting of:

(1)

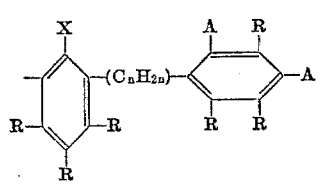

(2)

and (3)

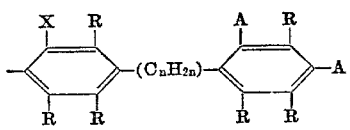

wherein $n$ is from 0 to 8, one A on each is a hydroxyl group and the other is selected from the group consisting of hydrogen and hydrocarbon radicals containing 1 to about 16 carbon atoms, X is selected from the group consisting of hydroxyl and a hydrocarbon radical containing 1 to about 16 carbon atoms, and R is selected from the group consisting of hydrogen and a hydrocarbon radical containing 1 to about 16 carbon atoms; and (b) 0.005 to 2 weight percent of a thio compound selected from the group consisting of (1) metal dithiocarbamates having the general formula:

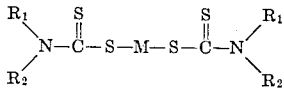

wherein M is selected from the group consisting of zinc, cadmium and mercury and $R_1$ and $R_2$ are hydrocarbon radicals containing from 1 to about 6 carbon atoms, (2) trithiophosphites having the formula:

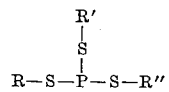

wherein R, R', R'' are hydrocarbon radicals each having from about 6 to about 20 carbon atoms, (3) thio ethers having the general structural formula R—S—R, wherein R is a hydrocarbon radical having from about 6 to about 20 carbon atoms, and (c) 0.0 to 2 weight percent of at least one material selected from the group consisting of (i) a soap of metal from Group II, III or IV of the Periodic Table and (ii) epoxy compounds.

2. The composition of matter as defined in claim 1, wherein said thio compound is trilauryltrithiophosphite.

3. The composition of claim 1 wherein (a) said phenol is a 2,4,6-trialkyl phenol the 2 and 6 position substituents of which are secondary or tertiary alkyl groups having from 3 to 20 carbon atoms or cyclic hydrocarbon groups, and the 4 position substituent of which is a normal alkyl group containing from 1 to 20 carbon atoms; (b) said thio compound is a trialkyl trithiophosphite wherein the alkyl groups are hydrocarbon radicals each having from about 6 to 20 carbon atoms; and (c) 0.005 to 2 weight percent of a soap of a metal of Group II, III or IV of the Periodic Table.

4. The composition of claim 1 wherein (a) said phenol has the general structural formula:

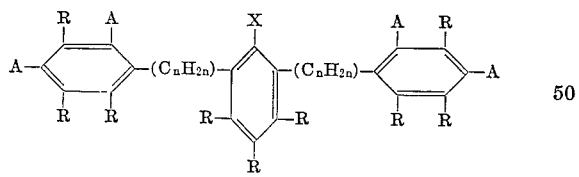

wherein $n$ is an integer from 0 to 8, one A on each ring is a hydroxyl group and the other A is selected from the group consisting of hydrogen and hydrocarbon radicals containing 1 to about 16 carbon atoms, X is selected from the group consisting of hydroxyl and hydrocarbon radicals containing 1 to about 16 carbon atoms, and R is selected from the group consisting of hydrogen and hydrocarbon radicals containing 1 to about 16 carbon atoms; (b) said thio compound is a trithiophosphite having the formula:

wherein R, R', and R'' are hydrocarbon radicals each having from about 6 to about 20 carbon atoms and 0.005 to 2 weight percent of an epoxy compound.

5. The composition of claim 1 wherein said thio compound is dihexadecyl sulfide.

6. The composition of claim 1 wherein said thio compound is zinc dibutyldithiocarbamate.

7. The composition of claim 1 wherein said phenol is 2,6-ditertiarybutyl para-cresol.

8. The composition of claim 1 wherein said phenol is 2,6 - bis - (2 - hydroxy-3-tertiarybutyl-5-methyl-benzyl)-4-methyl-phenol.

9. The composition of claim 1 wherein said phenol is 2,2'-methylene-bis-(4-ethyl-6-tertiarybutyl-phenol).

10. The composition of claim 1 wherein said phenol is 4,4'-methylene-bis-(2,6-ditertiarybutyl-phenol).

11. The composition of claim 1 wherein said phenol is bis - (2 - hydroxy - 3-tertiarybutyl-5-methyl-benzyl)-durene.

12. The composition of claim 1 wherein said soap is calcium stearate.

13. The composition of claim 1 wherein said soap is barium-cadmium laurate.

14. The composition of claim 1 wherein said epoxy compound is an epoxy resin having the formula:

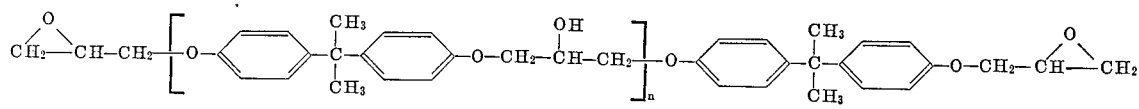

15. The composition of claim 1 wherein said epoxy compound is butyl epoxystearate.

16. A solid polymer of an olefin having 3 carbon atoms stabilized with a mixture of a phenolic anti-oxidant selected from the group consisting of hydrocarbon substituted phenols having a total of 4 to 24 carbon atoms in the hydrocarbon substituents and 2,2'-methylene bis-4, 6-dialkyl phenols and a tertiary hydrocarbon thiophosphite free of nonbenzenoid unsaturation.

17. A composition comprising solid polypropylene and a two component stabilizer consisting essentially of (1) .005 to about 2% by weight of 2,6-bis(2-hydroxy-3- tertiary butyl-5-methyl benzyl) 4-methyl phenol and (2) from about .005 to 2% by weight of dilauryl 3,3'-thiodipropionate.

18. A composition comprising solid polypropylene and a two component stabilizer consisting essentially of (1) 0.005 to 2% by weight of a polyphenol having the formula:

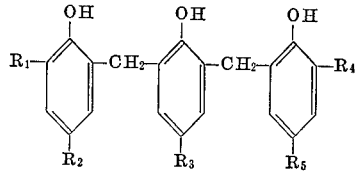

wherein $R_1$, $R_1$, $R_3$, $R_4$ and $R_5$ are alkyl radicals having 1 to 12 carbon atoms and (2) from about 0.005 to 2% by weight of a diester of 3,3'-thiodipropionic acid having the formula:

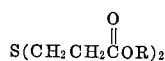

wherein R is an alkyl radical having 6 to 20 carbon atoms.

19. A composition of matter comprising (a) 2,6-ditertiary - butyl - p - cresol, (b) an organo sulfide selected from the group consisting of R—SR' wherein R and R' are alkyl radicals containing 6 to 20 carbon atoms and (c) a normally solid polymer prepared by reacting propylene in the presence of a catalyst prepared from a mixture of an organo-metallic compound and a compound of a heavy metal selected from the Group IV–B to VI–B of the Periodic Table, the total phenol and sulfide compounds being present in an amount by weight of 0.01 to 4% in a ratio of 5:1 to 1:5 parts by weight.

20. A composition of matter consisting essentially of predominately crystalline polypropylene, (a) 0.005 to 2 weight percent of a hindered phenol having the general formula:

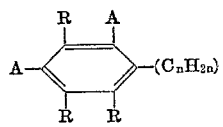

wherein B is a radical selected from the group consisting of:

(1)
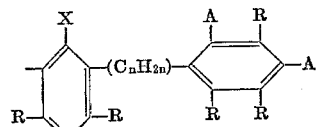

and (2)
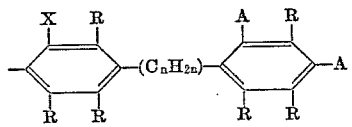

wherein $n$ is from 0 to 8, one A on each ring is a hydroxyl group and the other is selected from the group consisting of hydrogen and hydrocarbon radicals containing 1 to about 16 carbon atoms, X is selected from the group consisting of hydroxyl and a hydrocarbon radical containing 1 to about 16 carbon atoms, and R is selected from the group consisting of hydrogen and a hydrocarbon radical containing 1 to about 16 carbon atoms; (b) 0.005 to 2 weight percent of a thio-bis-(barboxylic acid esters) having the general formula:

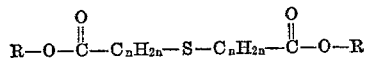

wherein R is a hydrocarbon radical having from about 6 to about 20 carbon atoms and $n$ is an integer from 1 to about 6; and (c) 0.0 to 2 weight percent of at least one material from the group consisting of: (i) a soap of a metal from Group II, III or IV of the Periodic Table and (ii) epoxy compounds.

21. The composition of claim 20 wherein said thioester is dilauryl thiodipropionate.

22. The composition of claim 20 wherein said phenol is bis - (2 - hydroxy - 3-tertiarybutyl-5-methyl-benzyl) durene.

23. The composition of claim 20 wherein said soap is calcium stearate.

24. The composition of claim 20 wherein said epoxy compound is an epoxy resin having the formula:

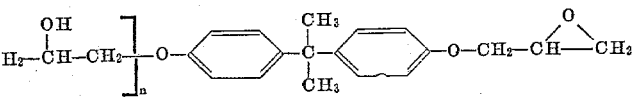

25. The composition of claim 20 wherein said epoxy compound is butyl epoxystearate.

26. The composition of claim 20 wherein said phenol is 2,6 - bis - (2 - hydroxy-3-t-butyl-5-methyl-benzyl)-4-methyl phenol.

References Cited

UNITED STATES PATENTS

| | | | |
|---|---|---|---|
| 2,889,295 | 6/1959 | Darby et al. | 260—45.95 |
| 2,889,307 | 6/1959 | Clayton | 260—45.95 |
| 2,890,193 | 6/1959 | Hardy | 260—45.95 |

HOSEA E. TAYLOR, Jr., Primary Examiner

U.S. Cl. X.R.

260—41, 45.7, 45.8, 45.85, 45.75, 45.9, 45.95, 837

PO-1050
(5/69)

UNITED STATES PATENT OFFICE
CERTIFICATE OF CORRECTION

Patent No. 3,496,128          Dated February 17, 1970

Inventor(s) John A. Casey, James L. Jezl and Louise D. Hague

It is certified that error appears in the above-identified patent and that said Letters Patent are hereby corrected as shown below:

Column 3, line 21, the word --Jr.-- was omitted after "Smith". Column 4, line 28, "4,4-bis(2-methyl-6-t-butyl phenol)" should be --4,4'-bis(2-methyl-6-t-butyl phenol)--. Column 5, line 25, the word --about-- should be inserted after "to". Table in Columns 7 and 8, Example 1, under heading "Percent", the numeral ".5" should be --.1--. Column 9, line 44, "$MI_a/MI_a$" should be --$MI_b/MI_a$--. Table in Columns 11 and 12, Example 60, under heading "Stabilizers", in first-listed compound, the word "ethylene" should be --methylene--. Column 14, line 53, "$R_1$" (second occurrence) should be deleted. Column 15, line 37, the word "barboxylic" should be --carboxylic--.

SIGNED AND
SEALED

JUL 7 1970

(SEAL)
Attest:

Edward M. Fletcher, Jr.
Attesting Officer

WILLIAM E. SCHUYLER, JR.
Commissioner of Patents